United States Patent [19]

Kobayashi

[11] 4,405,881

[45] Sep. 20, 1983

[54] COLOR CATHODE RAY TUBE INCLUDING $Nd_2O_3$ AND $Cr_2O_3$ IN FACE GLASS

[75] Inventor: Hiroo Kobayashi, Nagaokakyo, Japan

[73] Assignee: Mitsubishi Denki Kabushiki Kaisha, Tokyo, Japan

[21] Appl. No.: 265,678

[22] Filed: May 20, 1981

[30] Foreign Application Priority Data

May 29, 1980 [JP] Japan .................................. 55/72382
Aug. 28, 1980 [JP] Japan .................................. 55/119983

[51] Int. Cl.³ ............................................. H01J 29/86
[52] U.S. Cl. ............................................. 313/480
[58] Field of Search ............................. 313/480, 474

[56] References Cited

U.S. PATENT DOCUMENTS

| | | | |
|---|---|---|---|
| 3,143,683 | 8/1964 | Duncan et al. | 313/110 |
| 3,418,246 | 12/1968 | Royce | 313/468 X |
| 3,547,675 | 12/1970 | Hosokoshi | 428/207 |
| 3,654,505 | 4/1972 | Davis | 313/112 X |
| 3,873,868 | 3/1975 | Robinder | 313/112 |
| 3,946,267 | 3/1976 | Lustig et al. | 313/474 X |
| 3,950,668 | 4/1976 | Mattis | 313/468 |
| 4,065,696 | 12/1977 | Stierman | 313/480 |
| 4,172,920 | 10/1979 | Kanda | 428/469 X |
| 4,177,399 | 12/1979 | Muccigrosso et al. | 313/480 X |
| 4,209,567 | 6/1980 | Takahara et al. | 313/468 X |
| 4,307,320 | 12/1981 | Kotera et al. | 313/474 |

FOREIGN PATENT DOCUMENTS 52-42361  4/1977  Japan .................................. 313/474

Primary Examiner—Palmer C. Demeo
Attorney, Agent, or Firm—Oblon, Fisher, Spivak, McClelland & Maier

[57] ABSTRACT

A color cathode ray tube comprises a fluorescent screen having one or more phosphors on an inner surface of a face glass for plural emission colors, and the face glass which contains a $Nd_2O_3$ and other colorants to give a wavelength selectivity of light transmission of said face glass.

7 Claims, 7 Drawing Figures

COLOR CATHODE RAY TUBE INCLUDING $Nd_2O_3$ AND $Cr_2O_3$ IN FACE GLASS

BACKGROUND OF THE INVENTION

1. Field of the Invention

The present invention relates to a color cathode ray tube used for color displays for TV, and in industry, as well as for other special uses.

2. Description of the Prior Art

The face glasses of these color cathode ray tubes are classified by ranks of light transmission, into a clear face having visible light transmission of at least 75%, a gray face having visible light transmission of 60 to 75% and a tainted face having a visible light transmission of upto 60%. In the color cathode ray tubes, gray faces or clear faces having high light transmission have been mainly used in view of brightness. Tinted glass having less light transmission is suitable for absorbing outer light to improve contrast. In general, the output of the fluorescent screen of a color cathode ray tube is not high enough to give the desired light when the light transmission is low. Therefore, the clear or gray glass has been mainly used. In order to achieve high brightness and high contrast, various improvements have been studied. One of the improvements is a black matrix and recently a pigment phosphor has been used.

For example, a shadow mask type color receiver comprises a face glass part (1) on an inner surface of which a phosphor is coated; a funnel part (2) connected to the face glass with a glass frit; a neck part in which an electron gun is held, and a shadow mask (4) placed near the fluorescent screen inside of the vacuum envelope as shown in FIG. 1.

The shadow mask (4) has the function of a color selecting electrode so as to project electron beams (5B), (5G), (5R) which pass at specific angles through the holes of the shadow mask (4) which to correspond to phosphor dots (6B), (6G), (6R) for luminous colors formed on the screen which the electron beams reached.

The gray glass having the light transmission spectrum shown by the curve (II) in FIG. 4 has been mostly used as a face glass part (1) of a color cathode ray tube having such structure. The black matrix type face glass prepared by filling spaces between the phosphor dots (6B), (6G), (6R) of blue green and red, with a black paint as a light absorption material (7) as shown in FIG. 3 has been mainly used. The clear glass having high light transmission as the curve (I) in FIG. 4 has been mainly used as the face glass. The light of the phosphors is emitted as much as possible, out of the tube by using the clear glass. On the other hand, the black matrix layer is formed to absorb outer light and light which is reflected on the face glass surface to return the same to the fluorescent screen thereby improving contrast.

Recently, it has been proposed to use pigment phosphors prepared by incorporating a pigment in a phosphor so as to selectively increase the percent reflectivity of the emitted color of each phosphor thereby further improving contrast. The characteristics have been improved by these proposals however, the improvement is not enough level to satisfy the commercial requirements for higher brightness and higher contrast. When the tube is used for the terminal display of a computer, figures, symbols or graphs are displaced on a part of the screen in many cases so that the ratio of the luminous area to a total effective screen area is only upto 10% in many operations. An important problem is to improve the contrast without deteriorating brightness.

SUMMARY OF THE INVENTION

It is an object of the present invention to provide a face glass having a desired wavelength selectivity for light transmission so as to yield the maximum light transmission to the emission energy of the phosphor and to reduce light transmission in wavelength regions where there is no emission in the spectrum for the phosphor to increase the contrast.

DETAILED DESCRIPTION OF THE PREFERRED EMBODIMENTS

Figure 6:
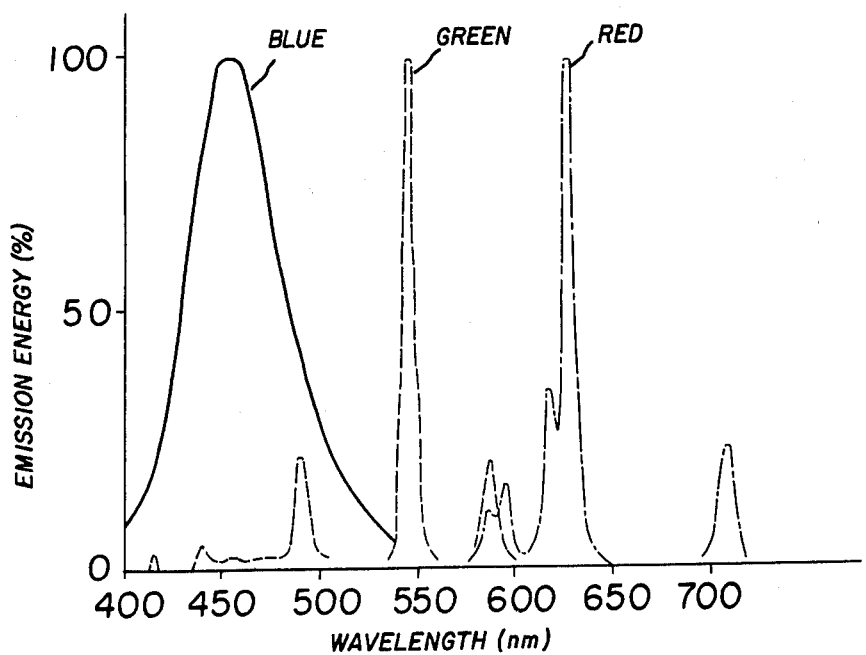
FIG. 6 is emission spectra of phosphors.

The inventors have found that the face glass of the conventional cathode ray tube has the flat characteristic of spectral transmission in the visible wavelength region. In old color cathode ray tubes, the phosphors have a relatively broad emission spectrum for each of phosphors in blue, green and red color regions. However, phosphors have been developed since then which exhibit substantially green phosphors linear spectral emission characteristics as shown in FIG. 6 such as $Gd_2O_2S$: Tb and $Y_2SiO_5$: Tb; and red phosphors such as $Y_2O_2S$: Eu. When the emission spectrum of the phosphor is linear, it is unnecessary for the face glass to to give a flat spectral transmission over all of the visible wavelength region and it is preferable to use the face glass having selective wavelength absorption characteristic.

In accordance with the process of the present invention, the face glass having the optimum spectral transmission characteristics for the requirement, is given by using a glass containing a rare earth oxide such as $Nd_2O_3$ (neodymium oxide), $Pr_2O_3$ (praseodymium oxide) which has light absorption characteristic in the wavelength regions of 470 to 480 nm; 510 to 530 nm and 570 to 585 nm.

Figure 1:
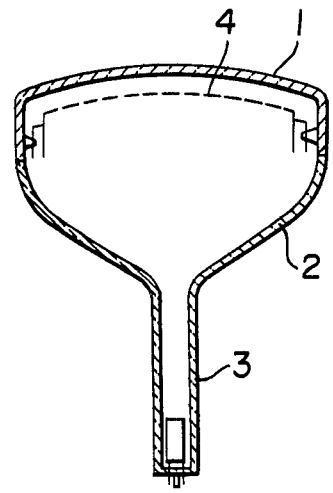
FIG. 1 is a sectional schematic view of a shadow mask type color cathode ray tube.
Figure 2:
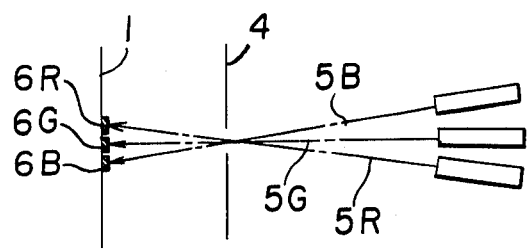
FIG. 2 shows the relation of phosphor dots and a shadow mask and electron beams.
Figure 3:
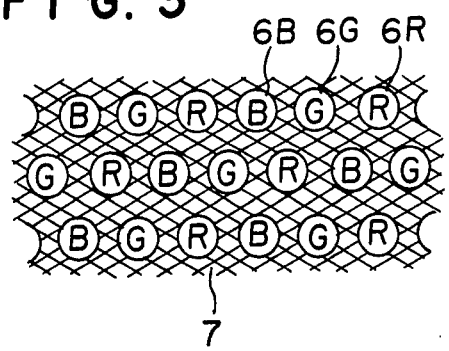
FIG. 3 shows black matrix fluorescent screen.
Figure 4:
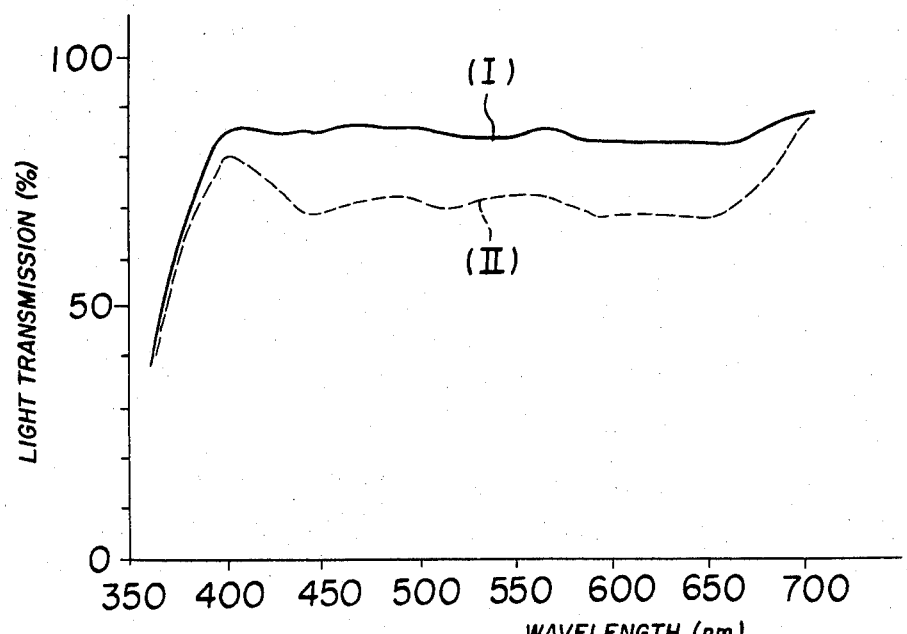
FIG. 4 is a graph of a spectral transmittance characteristic of a face glass for the conventional color cathode ray tube.
Figure 5:
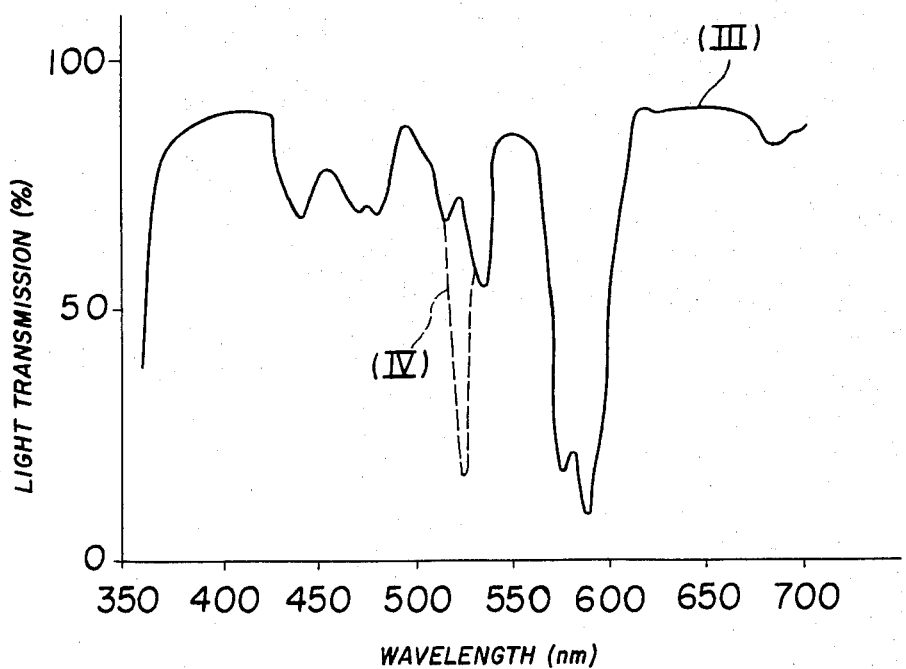
FIG. 5 is a graph of a spectral transmittance characteristic of a face glass for a color cathode ray tube according to the present invention.

The face glass having the spectral transmission shown by the curve (III) in FIG. 5 is given by using the glass incorporating the rare earth oxide. As is clearly evident from FIG. 5, the light transmission of the glass is at least 75% in the blue region, about 85% in the green region and about 90% in the red region. The transmission characteristics of emission energies of the phosphors are similar to those of the face glass using the clear glass and have large absorption bands in the wavelength region of 510 to 535 nm and 570 to 585 nm for the absorption of the outer light whereby remarkably higher contrast than the contrast of the gray glass can be given. Moreover, when $Er_2O_3$ (erbium oxide) for the local absorption characteristic at about 520 nm is further incorporated, the glass having the light transmission shown by the curve (IV) in FIG. 5 can be prepared whereby the contrast can be further improved without reducing the light transmission.

The features of the invention for using the phosphors having the linear spectral emission characteristics and forming the face glass with the glass having the wavelength selectivity can be combined with the conventional black matrix technology and the pigment-phosphor technology. An ideal color cathode ray tube having excellent contrast characteristic can be obtained by the desired combination. The combination of the feature of the invention with the pigment-phosphors especially improves the wavelength selective characteristic and the remarkable effect can be expected by these combinations.

In the other embodiments of the present invention, the face glass is made of a glass containing neodymium oxide $Nd_2O_3$ having the light absorption characteristics in the wavelength regions of about 470 to 480 nm; 510 to 530 nm and 570 to 585 nm. The glass having spectral transmissions shown by the curves (III) or (IV) in FIG. 7 can be obtained by incorporating a small amount of $Nd_2O_3$ and other colorants.

Figure 7:
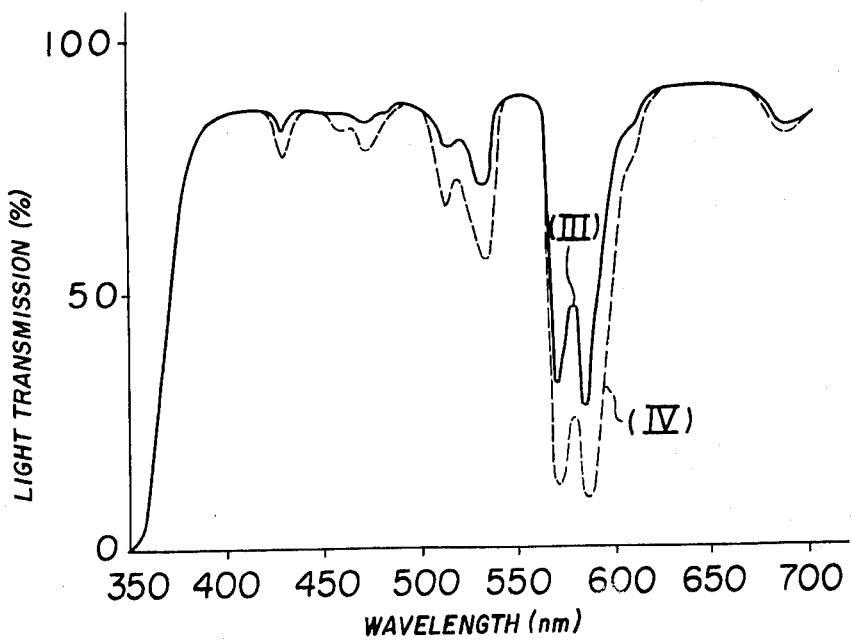
FIG. 7 is a graph of a spectral transmittance characteristic of the other embodiment of a face glass for a color cathode ray tube according to the present invention.

In FIG. 7, the spectral transmission of the glass containing 0.5 wt.% of $Nd_2O_3$ is shown by the curve (III) and the spectral transmission of the glass containing 1.0 wt.% of $Nd_2O_3$ is shown by the curve (IV). The spectral transmission of the glass plates having a thickness of 10.0 mm are respectively measured. The thickness is substantially the same as those of the face glasses of the color cathode ray tubes at the center. When the thickness of the face glass is thinner is small size cathode ray tubes, the content of $Nd_2O_3$ is increased to give the same effect. In order to consider the content of $Nd_2O_3$, it is in a range of 0.3 to 1.5 wt.% in the case of the thickness of about 10 mm and in a range of 2.0 to 7.0 wt.% in the case of the thickness of about 2 mm, it is in inverse contents versus glass thickness. When the content of $Nd_2O_3$ is smaller, the effect is not enough whereas when it is greater, adverse effects such as inferior glass melting property are caused and the cost for the glass is increased as the disadvantageous effects.

As it is found in FIG. 7, the glass has the broad absorption band in the wavelength region of 570 to 580 nm. Therefore, when the face glass is combined with the phosphors having the emission spectrum shown in FIG. 6, the contrast can be improved without a deterioration of the output emission for the display.

In accordance with the present invention, the light transmission of the face glass has the wavelength selectivity to selectively improve the light transmission of the emission spectral bands of the phosphors and to increase the light absorption in the non-emission spectral bands whereby the contrast to the outer light is improved without a deterioration of brightness. Therefore, the color cathode ray tube for clear color display having excellent contrast and brightness can be obtained.

The color cathode ray tube having three phosphors in blue, green and red has been illustrated. Thus, the same effects can be imparted for a cathode ray tube having a combination of phosphors in green and red and white in which the white phosphor is obtained by mixing phosphors in blue, green and red at desired ratios or a beam penetration type cathode ray tube obtained by mixing phosphors in green and red or forming multilayers of phosphors.

The glass containing $Nd_2O_3$ has slight bluish violet body color. Thus, the body color can be controlled by adding a small amount of a metal oxide of a metal such as nickel, cobalt, chromium or iron. When the color tone of the glass containing $Nd_2O_3$ is not suitable, the color tone can be easily controlled.

The inventors made a study of the body color and viewability, As a result, the most suitable combinations are compositions which contain less than 100 ppm of $Cr_2O_3$, and/or less than 0.5% of $Pr_2O_3$.

I claim:

1. In a color cathode ray tube comprising a fluorescent screen having at least one phosphor on an inner surface of the face glass for plural color emission, the improvement comprising:
    incorporating 0.3 to 1.5 wt% per 10 mm glass thickness, of $Nd_2O_3$ and a small amount of the colorant $Cr_2O_3$ and optionally other colorants in said face glass to impart wavelength selectivity to said face glass.

2. The color cathode ray tube of claim 1, wherein said face glass further contains less than 0.5 wt% of $Pr_2O_3$ as a second colorant.

3. The color cathode ray tube of claim 1 or 2, wherein said phosphor is a pigment phosphor.

4. The color cathode ray tube of claim 1 or 2, wherein said fluorescent screen is formed upon admixture of a plurality of phosphors thereby giving rise to plural color emission on the part of said cathode ray tube.

5. The color cathode ray tube of claim 1 or 2, wherein said green phosphor is $Gd_2O_2S$: Tb or $Y_2SiO_5$: Tb either of which gives a main linear emission wavelength at about 540 to 550 nm.

6. The cathode ray tube of claim 1 or 2, wherein the phosphors on the inner surface of said face glass which emit green and red light exhibit substantially linear spectral emission characteristics.

7. The cathode ray tube of claim 1, wherein said face glass containing neodymium oxide exhibits light absorption characteristics in the wavelength regions of about 470 to 480 nm, 510 to 530 nm and 570 to 585 nm.

* * * * *

REEXAMINATION CERTIFICATE (916th)
United States Patent [19]
Kobayashi

[11] B1 4,405,881
[45] Certificate Issued  Aug. 30, 1988

[54] COLOR CATHODE RAY TUBE INCLUDING $Nd_2O_3$ AND $CR_2O_3$ IN FACE GLASS

[75] Inventor: Hiroo Kobayashi, Nagaokakyo, Japan

[73] Assignee: Mitsubishi Denki Kabushiki Kaisha, Tokyo, Japan

Reexamination Request:
No. 90/000,788, May 24, 1985
No. 90/000,823, Jul. 22, 1985

Reexamination Certificate for:
Patent No.: 4,405,881
Issued: Sep. 20, 1983
Appl. No.: 265,678
Filed: May 20, 1981

[30] Foreign Application Priority Data

May 29, 1980 [JP] Japan .................................. 55/72382
Aug. 28, 1980 [JP] Japan ................................ 55/119983

[51] Int. Cl.⁴ .............................................. H01J 29/86
[52] U.S. Cl. ...................................................... 313/480
[58] Field of Search ............................................ 313/468

[56] References Cited
U.S. PATENT DOCUMENTS

| | | | |
|---|---|---|---|
| 3,143,683 | 8/1964 | Duncan et al. | 313/110 |
| 3,464,932 | 9/1969 | Connelly et al. | 252/478 |
| 3,875,449 | 4/1975 | Byler et al. | 313/468 X |
| 4,177,399 | 12/1979 | Muccigrosso | 313/480 X |
| 4,390,637 | 9/1981 | Daiku | 501/64 |

FOREIGN PATENT DOCUMENTS 55-113644 9/1980 Japan .
869453 5/1961 United Kingdom .
1154500 6/1969 United Kingdom .

OTHER PUBLICATIONS

Waldeman A. Weyl, "Coloured Glasses", Society of Glass Technology (England), 1951, pp. 218–234.
Weyl, Colored Glasses, SOT, pp. 218–234, 1957.

*Primary Examiner*—Palmer C. Demeo

[57]  ABSTRACT

A color cathode ray tube comprises a fluorescent screen having one or more phosphors on an inner surface of a face glass for plural emission colors, and the face glass which contains a $Nd_2O_3$ and other colorants to give a wavelength selectivity of light transmission of said face glass.

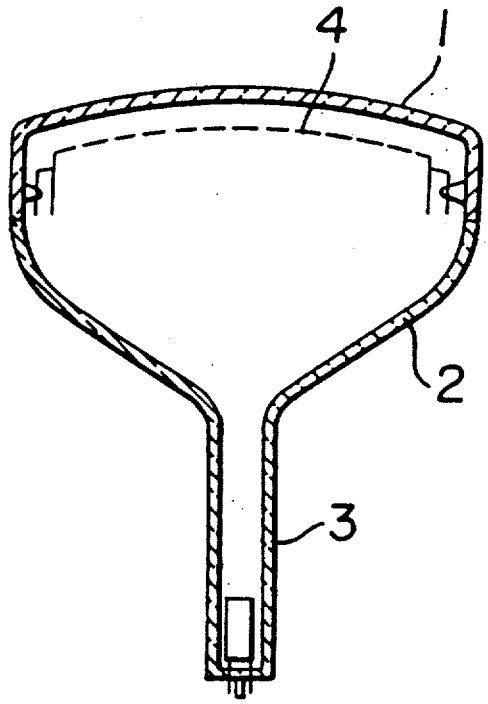

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–7 are cancelled.

* * * * *